(12) United States Patent
Sato et al.

(10) Patent No.: US 11,487,599 B2
(45) Date of Patent: Nov. 1, 2022

(54) INFORMATION PROCESSING APPARATUS AND INFORMATION PROCESSING METHOD

(71) Applicant: Nippon Telegraph and Telephone Corporation, Tokyo (JP)

(72) Inventors: Noriyuki Sato, Tokyo (JP); Takuo Kanamitsu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/423,022

(22) PCT Filed: Jan. 8, 2020

(86) PCT No.: PCT/JP2020/000335
§ 371 (c)(1),
(2) Date: Jul. 14, 2021

(87) PCT Pub. No.: WO2020/149197
PCT Pub. Date: Jul. 23, 2020

(65) Prior Publication Data
US 2022/0075681 A1 Mar. 10, 2022

(30) Foreign Application Priority Data
Jan. 16, 2019 (JP) .............................. JP2019-004839

(51) Int. Cl.
*G06F 11/00* (2006.01)
*G06F 11/07* (2006.01)
*G06F 11/16* (2006.01)

(52) U.S. Cl.
CPC ........ *G06F 11/0763* (2013.01); *G06F 11/073* (2013.01); *G06F 11/167* (2013.01)

(58) Field of Classification Search
CPC ............... G06F 11/073; G06F 11/0763; G06F 11/1666; G06F 11/167
See application file for complete search history.

(56) References Cited

U.S. PATENT DOCUMENTS

| | | | | |
|---|---|---|---|---|
| 6,067,656 A | * | 5/2000 | Rusu ................... | G06F 11/1064 714/768 |
| 7,930,536 B2 | * | 4/2011 | Takabayashi ........... | H04L 63/08 713/168 |

(Continued)

FOREIGN PATENT DOCUMENTS

| | | |
|---|---|---|
| JP | H10234061 | 9/1998 |
| JP | 2007114404 | 5/2007 |
| JP | 2010130367 | 6/2010 |

OTHER PUBLICATIONS

Kanamitsu, "A Study on the Detection Method of Voice System Fault in Communication Systems," IEICE 2018 General Conference Lecture Proceedings Communication 2, Mar. 20, 2018, p. 81, 7 pages (With English Translation).

(Continued)

*Primary Examiner* — Marc Duncan
(74) *Attorney, Agent, or Firm* — Fish & Richardson P.C.

(57) ABSTRACT

Failure of a processing unit that processes a plurality of information pieces is discovered in a short time. An information processing device 100 including a processing unit 1 that processes a plurality of information pieces includes: an identifier assignment unit 2 that assigns identifiers 60000 to 61023 to the plurality of information pieces 40000 to 41023, respectively; a plurality of input memories 20000 to 21023 that retain the plurality of information pieces 40000 to 41023 and the identifiers 60000 to 61023 assigned to the plurality of information pieces 40000 to 41023, respectively; a plurality of output memories 30000 to 31023 that retain the plurality of information pieces 50000 to 51023 processed by (Continued)

the processing unit 1 and the identifiers 70000 to 71023 assigned to the plurality of processed information pieces 50000 to 51023, respectively; an identifier verification unit 3 that verifies the identifiers 70000 to 71023 by comparing the identifiers 70000 to 71023 with the identifiers 60000 to 61023, respectively; and an error handling unit 4 that performs error handling when identifiers do not match with each other.

6 Claims, 3 Drawing Sheets

(56) References Cited

U.S. PATENT DOCUMENTS

2010/0128726 A1* 5/2010 Takakuwa ............. H04L 49/208
　　　　　　　　　　　　　　　　　　　　　　　370/390
2022/0100881 A1* 3/2022 Sato .................... G06F 21/6218

OTHER PUBLICATIONS wikipedia.com, "Digital Signal Processor," retrieved on Oct. 20, 2018, retrieved from URL <https://ja.wikipedia.org/wiki/デジタルシグナルプロセッサ>, 13 pages (With English Translation).

* cited by examiner

INFORMATION PROCESSING APPARATUS AND INFORMATION PROCESSING METHOD

CROSS-REFERENCE TO RELATED APPLICATIONS

This application is a National Stage application under 35 U.S.C. § 371 of International Application No. PCT/JP2020/000335, having an International Filing Date of Jan. 8, 2020, which claims priority to Japanese Application Serial No. 2019-004839, filed on Jan. 16, 2019. The disclosure of the prior application is considered part of the disclosure of this application, and is incorporated in its entirety into this application.

TECHNICAL FIELD

The present invention relates to an information processing device and an information processing method.

BACKGROUND ART

Some of conventional information processing devices include a single processing unit, and the processing unit processes a plurality of information pieces. Such information processing devices include a plurality of input memories and a plurality of output memories in order to process the plurality of information pieces. For example, when an information processing device processes 1024-ch information pieces ("ch" is an abbreviation for "channel"), the information processing device includes input memories for the 1024 chs and output memories for the 1024 chs.

When the processing unit is normal, the processing unit reads information of an N-th (N=0, 1, . . . , 1022, 1023) ch from an input memory for the N-th ch and, after processing the information, writes the processed information to an output memory for the N-th ch. However, when the processing unit fails, the processing unit reads information of the N-th ch from the input memory for the N-th ch and, after processing the information, erroneously writes the processed information to an output memory for an M-th (M=0, 1, . . . , 1022, 1023 and M≠N) ch in some cases. As a result, a situation may be brought about where information of the M-th ch that is different from the information supposed to be outputted is outputted to a receiver who is to receive the information of the N-th ch.

However, even when a processing unit fails as described above, there has conventionally been no means for discovering such failure in a short time. Accordingly, there has been a problem that the situation continues where information that is different from information supposed to be outputted is outputted. Particularly in digital signal processing by a DSP (Digital Signal Processor) as a processing unit (see Non-Patent Literature 1), the processing needs to be completed within a predetermined time period (latency), so a processing rate tends to be prioritized. Accordingly, conventionally, amending a processing error such as ch switching is viewed as less important.

CITATION LIST

Non-Patent Literature

Non-Patent Literature 1: "Digital signal processor", [online], [retrieved on Jan. 7, 2019], Internet <URL: https://ja.wikipedia.org/wiki/%E3%83%87%E3%82%B8%E3%82%BF%-E3%83%AB%E3%82%B7%B3%82%B0%-E3%83%8A%E3%83%AB%E3%83%97%-E3%83%AD%E3%82%BB%E3%83%83%E3%82%B5>

SUMMARY OF THE INVENTION

Technical Problem

In view of such a background, the present invention addresses the challenge of discovering, in a short time, failure of a processing unit that processes a plurality of information pieces.

Means for Solving the Problem

To solve the challenge, an aspect of the invention according to claim 1 is an information processing device including a processing unit that processes a plurality of information pieces, including: an identifier assignment unit that assigns identifiers to the plurality of information pieces, respectively; a plurality of input memories that retain the plurality of information pieces and the identifiers assigned to the plurality of information pieces, respectively; a plurality of output memories that retain the plurality of information pieces processed by the processing unit and the identifiers assigned to the plurality of processed information pieces, respectively; and an identifier verification unit that verifies the identifiers respectively retained in the output memories, by comparing the identifiers respectively retained in the output memories with the identifiers respectively retained in the input memories, respectively.

An aspect of the invention according to claim 3 is an information processing method in an information processing device including a processing unit that processes a plurality of information pieces, including: by the information processing device, assigning identifiers to the plurality of information pieces, respectively; retaining the plurality of information pieces and the identifiers assigned to the plurality of information pieces in a plurality of input memories, respectively; retaining the plurality of information pieces processed by the processing unit and the identifiers assigned to the plurality of processed information pieces in a plurality of output memories, respectively; and verifying the identifiers respectively retained in the output memories, by comparing the identifiers respectively retained in the output memories with the identifiers respectively retained in the input memories, respectively.

According to the aspects of the invention according to claims 1 and 3, by verifying an identifier retained in an output memory, it can be reliably determined whether or not an information piece to which the identifier is assigned is intended information, that is, whether or not an information piece to which the identifier is assigned is information supposed to be retained in the output memory.

Accordingly, failure of the processing unit that processes the plurality of information pieces can be discovered in a short time.

An aspect of the invention according to claim 2 is the information processing device according to claim 1, further including an error handling unit that performs error handling when, as a result of the verification, an identifier retained in a specified output memory among the plurality of output memories does not match with an identifier retained in a specified one of the input memories that corresponds to the specified output memory.

An aspect of the invention according to claim 4 is the information processing method according to claim 3, further including, by the information processing device, performing error handling when, as a result of the verifying, an identifier retained in a specified output memory among the plurality of output memories does not match with an identifier retained in a specified one of the input memories that corresponds to the specified output memory.

According to the aspects of the invention according to claims 2 and 4, means for handling when failure of the processing unit is discovered can be provided.

Effects of the Invention

According to the present invention, failure of a processing unit that processes a plurality of information pieces can be discovered in a short time.

DESCRIPTION OF EMBODIMENTS

Hereinafter, an embodiment for carrying out the present invention (hereinafter, referred to as the "present embodiment") will be described with reference to drawings.

[Configuration]

Figure 1:
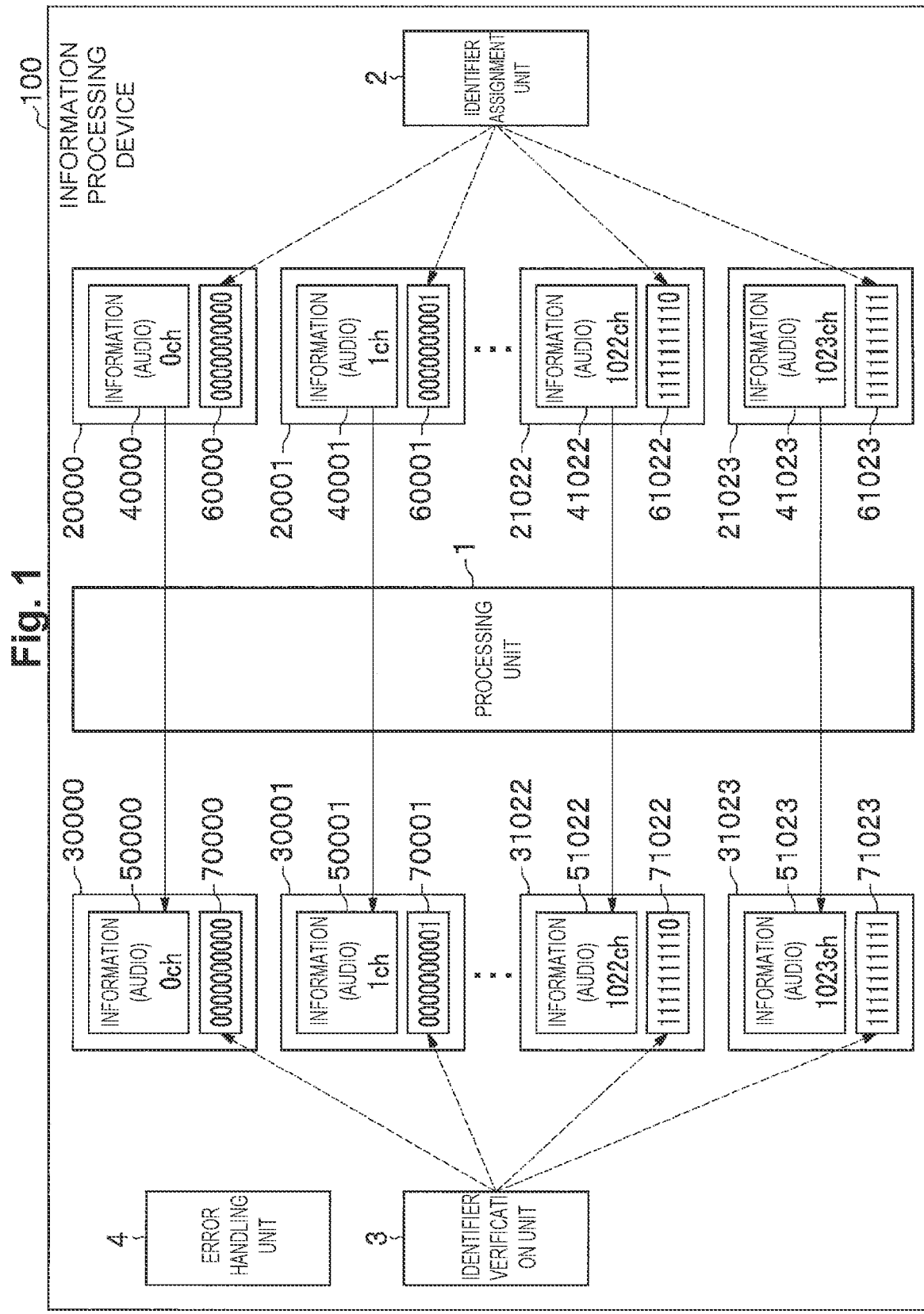
FIG. 1 is an example of a functional configuration diagram of an information processing device according to an embodiment, and is an explanatory diagram when a processing unit is normal.

As shown in FIG. 1, an information processing device 100 according to the present embodiment includes a processing unit 1, input memories 20000 to 21023, output memories 30000 to 31023, an identifier assignment unit 2, an identifier verification unit 3, and an error handling unit 4. In the present embodiment, a description is given, assuming that the information processing device 100 processes information pieces of 1024 chs.

The processing unit 1 processes a plurality of information pieces. In the present embodiment, a description is given, assuming that the information processing device 100 includes the single processing unit 1. However, the present invention is also applicable when the information processing device 100 includes a plurality of the processing units 1. For example, the processing unit 1 may be, but is not limited to, a microcomputer or a DSP. For example, processing by the processing unit 1 may be, but is not limited to, echo cancellation, codec conversion, or bandwidth compression.

The input memories 20000 to 21023 retain information pieces 40000 to 41023 of the 1024 chs inputted into the information processing device 100, respectively. The information pieces 40000 to 41023 are information before processed by the processing unit 1. For example, the information pieces 40000 to 41023 may be, but is not limited to, audio.

The output memories 30000 to 31023 retain information pieces 50000 to 51023 of the 1024 chs to be outputted from the information processing device 100 to a receiver (not shown), respectively. The information pieces 50000 to 51023 are information after processed by the processing unit 1. For example, the information pieces 50000 to 51023 may be, but is not limited to, audio.

When the processing unit 1 is normal, the processing unit 1 reads an information piece of an N-th (N=0, 1, . . . , 1022, 1023) ch from an input memory for the N-th ch and, after processing the information piece, writes the processed information piece to an output memory for the N-th ch.

The identifier assignment unit 2 assigns identifiers 60000 to 61023 that identify the information pieces 40000 to 41023, respectively, to the information pieces 40000 to 41023, respectively. For example, the identifiers 60000 to 61023 may be, but are not limited to, 10-bit binary data. The input memories 20000 to 21023 include areas in which the information pieces 40000 to 41023 are retained, respectively, and areas in which the identifiers 60000 to 61023 are retained, respectively, and retain the information pieces 40000 to 41023 and the identifiers 60000 to 61023, respectively.

When the processing unit 1 reads the information piece of the N-th ch from the input memory for the N-th ch, the processing unit 1 also reads an identifier assigned to the information piece of the N-th ch. When the processing unit 1 processes the information piece of the N-th ch, the processing unit 1 leaves the identifier assigned to the information piece of the N-th ch unchanged. The processing unit 1 writes the processed information piece of the N-th ch and the identifier assigned to the processed information piece of the N-th ch to the output memory for the N-th ch. The output memories 30000 to 31023 include areas in which the processed information pieces 50000 to 51023 are retained, respectively, and areas in which identifiers 70000 to 71023 assigned to the information pieces 50000 to 51023 are retained, respectively, and retain the information pieces 50000 to 51023 and the identifiers 70000 to 71023, respectively.

The identifier verification unit 3 verifies the identifiers 70000 to 71023 respectively retained in the output memories 30000 to 31023, by comparing the identifiers 70000 to 71023 with the identifiers 60000 to 61023 respectively retained in the input memories 20000 to 21023, respectively. Specifically, the identifier verification unit 3 reads the identifier assigned to the processed information piece of the N-th ch from the output memory for the N-th ch, and determines whether or not the read identifier matches with the identifier that is assigned to the information piece of the N-th ch before processed and is retained in the input memory for the N-th ch (corresponding input memory). Note that the identifier verification unit 3 keeps track of which one of the input memories 20000 to 21023 each identifier assigned by the identifier assignment unit 2 is retained in.

The error handling unit 4 performs error handling when an identifier mismatch is found between the identifiers 70000 to 71023 and the identifiers 60000 to 61023 as a result of the verification of the identifiers 70000 to 71023 by the identifier verification unit 3. Specifically, when the identifier assigned to the processed information piece of the N-th ch and read from the output memory for the N-th ch does not match with the identifier assigned to the information piece of the N-th ch before processed and retained in the input memory for the N-th ch, the error handling unit 4 determines that the processing unit 1 fails, and performs error handling. For example, the error handling can be, but is not limited to, to notify an administrator or to discard the information piece with the mismatching identifier.

An operation example will be described, with respect to an information piece 41022 of a 1022nd ch and an identifier 61022 with a value of "1111111110" assigned to the information piece 41022, which are retained in a 1022nd-ch input memory 21022, and an information piece 41023 of a 1023rd ch and an identifier 61023 with a value of "1111111111" assigned to the information piece 41023, which are retained in a 1023rd-ch input memory 21023, shown in FIG. 1.

When the processing unit 1 is normal, the processing unit 1 reads the information piece 41022 of the 1022nd ch and the identifier 61022 from the 1022nd-ch input memory 21022 and performs processing. After the processing, the processing unit 1 writes a processed information piece 51022 of the 1022nd ch and an identifier 71022 with the unchanged value of "1111111110" to a 1022nd-ch output memory 31022. The identifier verification unit 3 reads the identifier 71022 assigned to the processed information piece 51022 of the 1022nd ch from the 1022nd-ch output memory 31022, and determines whether or not the identifier 71022 matches with the identifier 61022 that is assigned to the information piece of the 1022nd ch before processed and is retained in the 1022nd-ch input memory 21022. In the present case, since both the identifiers 71022, 61022 have the value of "1111111110" and match with each other, it is determined that the processing unit 1 is normal. Moreover, it is determined that the processed information piece 51022 of the 1022nd ch retained in the 1022nd-ch output memory 31022 corresponds to the information piece 41022 of the 1022nd ch before processed retained in the 1022nd-ch input memory 21022.

Similarly, the processing unit 1 reads the information piece 41023 of the 1023rd ch and the identifier 61023 from the 1023rd-ch input memory 21023 and performs processing. After the processing, the processing unit 1 writes a processed information piece 51023 of the 1023rd ch and an identifier 71023 with the unchanged value of "1111111111" to a 1023rd-ch output memory 31023. The identifier verification unit 3 reads the identifier 71023 assigned to the processed information piece 51023 of the 1023rd ch from the 1023rd-ch output memory 31023, and determines whether or not the identifier 71023 matches with the identifier 61023 that is assigned to the information piece of the 1023rd ch before processed and is retained in the 1023rd-ch input memory 21023. In the present case, since both the identifiers 71023, 61023 have the value of "1111111111" and match with each other, it is determined that the processing unit 1 is normal. Moreover, it is determined that the processed information piece 51023 of the 1023rd ch retained in the 1023rd-ch output memory 31023 corresponds to the information piece 41023 of the 1023rd ch before processed retained in the 1023rd-ch input memory 21023.

Figure 2:
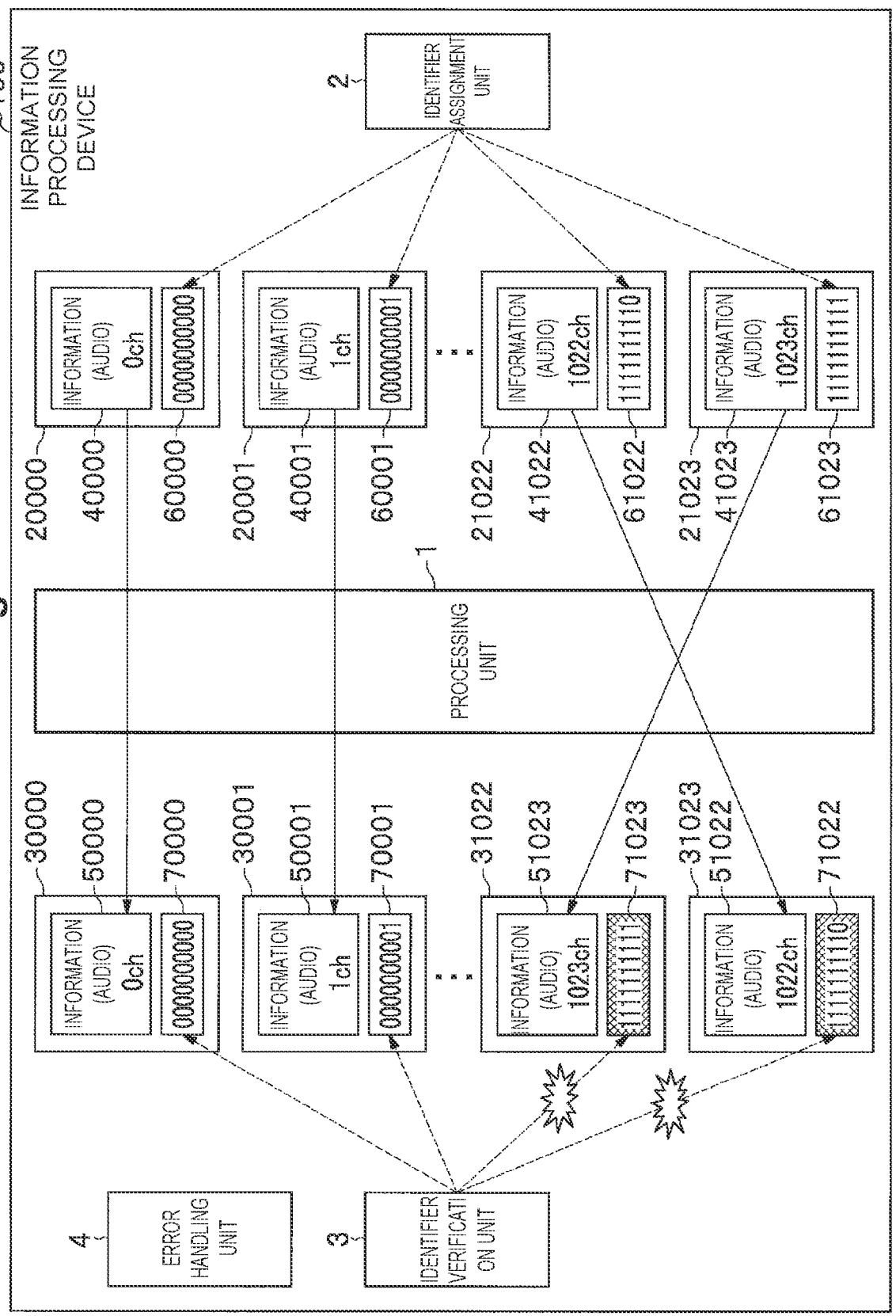
FIG. 2 is an explanatory diagram when the processing unit fails.

When the processing unit 1 fails, it is assumed that the processed information piece 51023 of the 1023rd ch and the identifier 71023 with the value of "1111111111" assigned to the information piece 51023 are retained in the 1022nd-ch output memory 31022, as shown in FIG. 2. The identifier verification unit 3 verifies the identifier 71023 read from the 1022nd-ch output memory 31022. In the present case, the value "1111111111" of the identifier 71023 read from the 1022nd-ch output memory 31022 does not match with the value "1111111110" of the identifier 61022 that is assigned to the information piece 41022 of the 1022nd ch before processed and is retained in the 1022nd-ch input memory 21022. Accordingly, the identifier verification unit 3 determines that the processing unit 1 fails. Moreover, it is determined that the processed information piece 51023 of the 1023rd ch retained in the 1022nd-ch output memory 31022 does not correspond to the information piece 41022 of the 1022nd ch before processed retained in the 1022nd-ch input memory 21022. Accordingly, the error handling unit 4 performs error handling for the processed information piece 51023 of the 1023rd ch retained in the 1022nd-ch output memory 31022.

Similarly, it is assumed that the processed information piece 51022 of the 1022nd ch and the identifier 71022 with the value of "1111111110" assigned to the information piece 51022 are retained in the 1023rd-ch output memory 31023, as shown in FIG. 2. The identifier verification unit 3 verifies the identifier 71022 read from the 1023rd-ch output memory 31023. In the present case, the value "1111111110" of the identifier 71022 read from the 1023rd-ch output memory 31023 does not match with the value "1111111111" of the identifier 61023 that is assigned to the information piece 41023 of the 1023rd ch before processed and is retained in the 1023rd-ch input memory 21023. Accordingly, the identifier verification unit 3 determines that the processing unit 1 fails. Moreover, it is determined that the processed information piece 51022 of the 1022nd ch retained in the 1023rd-ch output memory 31023 does not correspond to the information piece 41023 of the 1023rd ch before processed retained in the 1023rd-ch input memory 21023. Accordingly, the error handling unit 4 performs error handling for the processed information piece 51022 of the 1022nd ch retained in the 1023rd-ch output memory 31023.

[Processing]

Next, processing by the information processing device 100 will be described with reference to FIG. 3. The present processing is started when information pieces of the 1024 chs are inputted into the information processing device 100.

First, the information processing device 100, through the identifier assignment unit 2, assigns an individual identifier to each of the information pieces of the 1024 chs (step S1). Next, the information processing device 100 retains the information pieces of the 1024 chs and the identifiers respectively assigned to the information pieces in the input memories 20000 to 21023 for the 1024 chs, respectively (step S2).

Next, the information processing device 100, through the processing unit 1, reads the information pieces and the identifiers from the input memories 20000 to 21023, respectively, and processes the information pieces (step S3). At the time, the processing unit 1 does not change the identifiers. Next, the information processing device 100, through the processing unit 1, writes the processed information pieces of the 1024 chs and the identifiers respectively assigned to the processed information pieces to the output memories (step S4). At the time, the processing unit 1 writes a processed information piece of the N-th ch and an identifier assigned to the processed information piece to an output memory for the N-th ch.

Next, the information processing device 100 performs loop processing with respect to a variable N (N=0, 1, . . . , 1022, 1023) in step S5 (S5a, S5b) to step S8. First, the information processing device 100, through the identifier verification unit 3, verifies the identifier retained in the output memory for the N-th ch (step S6). Next, the information processing device 100, through the identifier verification unit 3, determines whether or not the verification-target identifier retained in the output memory for the N-th ch matches with an identifier retained in an input memory for the N-th ch (step S7).

When the identifiers match with each other (Yes in step S7), the information processing device 100, through the identifier verification unit 3, determines that the processing unit 1 is normal. Thereafter, the information processing device 100 performs the loop processing on a next identifier. When the identifiers do not match with each other (No in step S7), the information processing device 100, through the identifier verification unit 3, determines that the processing unit 1 fails. In such a case, the information processing device 100, through the error handling unit 4, performs error handling for a processed information piece of the N-th ch retained in the output memory for the N-th ch (step S8). Thereafter, the information processing device 100 performs the loop processing on a next identifier.

When the loop processing is performed on all of N, the processing by the information processing device 100 is terminated.

According to the present embodiment, by verifying an identifier retained in an output memory, it can be reliably determined whether or not an information piece to which the identifier is assigned is intended information, that is, whether or not an information piece to which the identifier is assigned is information supposed to be retained in the output memory.

Accordingly, failure of the processing unit 1 that processes a plurality of information pieces can be discovered in a short time.

Moreover, means for handling when the failure of the processing unit 1 is discovered can be provided.

(Other)

Figure 3:
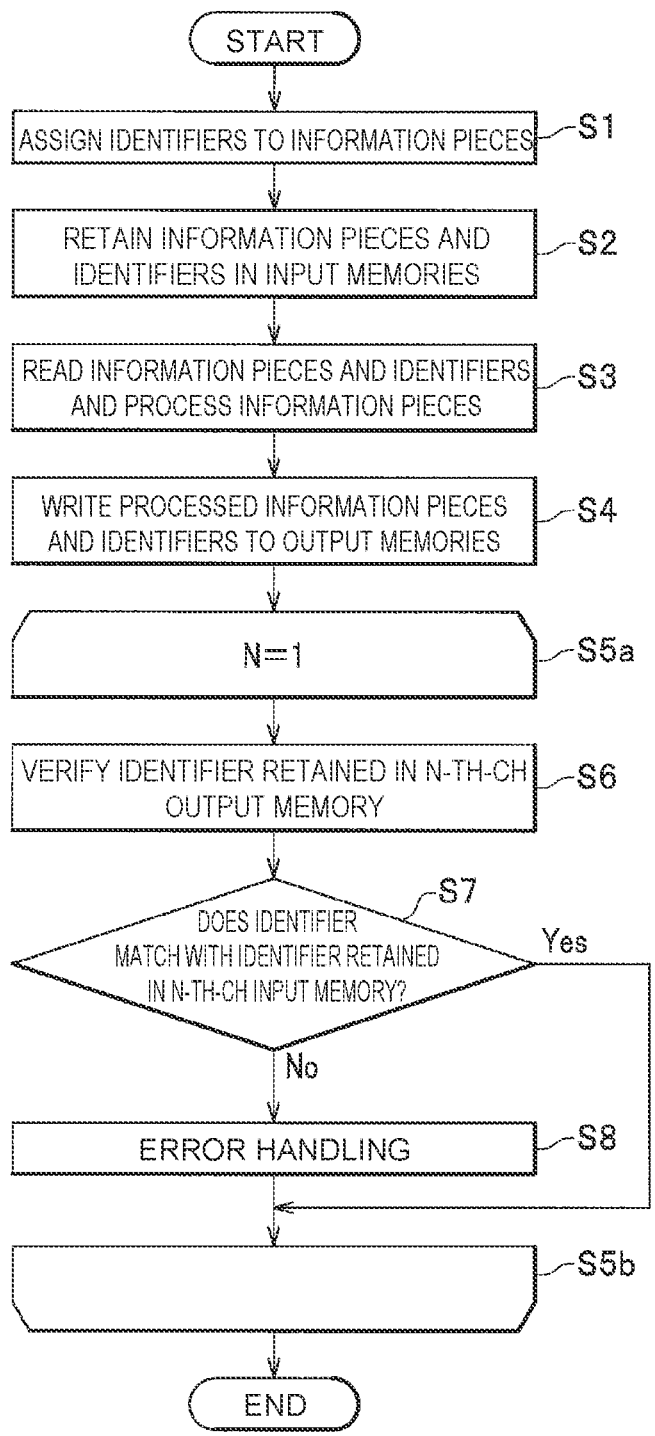
FIG. 3 is a flowchart showing processing by the information processing device.

In the present embodiment, the information processing device 100 is configured, through the error handling unit 4, to perform error handling for the processed information piece of the N-th ch retained in the output memory for the N-th ch (see step S8 in FIG. 3). However, for example, the error handling unit 4 may perform error handling on the information processing device 100 as a whole when an identifier mismatch is found with respect to even one ch.

A technique can also be implemented by combining various techniques described in the present embodiment as appropriate.

REFERENCE SIGNS LIST

100 Information processing device
1 Processing unit
2 Identifier assignment unit
3 Identifier verification unit
4 Error handling unit
20000 to 21023 Input memories
30000 to 31023 Output memories
40000 to 41023 Information pieces (before processed)
50000 to 51023 Information pieces (after processed)
60000 to 61023 Identifiers (retained in the input memories)
70000 to 71023 Identifiers (retained in the output memories)

The invention claimed is:

1. An information processing device including a processing unit, including one or more processors, configured to process a plurality of information pieces, comprising:
   an identifier assignment unit, including one or more processors, configured to assign identifiers to the plurality of information pieces, respectively;
   a plurality of input memories configured to retain the plurality of information pieces and the identifiers assigned to the plurality of information pieces, respectively;
   a plurality of output memories configured to retain the plurality of information pieces processed by the processing unit and the identifiers assigned to the plurality of processed information pieces, respectively; and
   an identifier verification unit, including one or more processors, configured to verify the identifiers respectively retained in the output memories, by comparing the identifiers respectively retained in the output memories with the identifiers respectively retained in the input memories, respectively.

2. The information processing device according to claim 1, further comprising an error handling unit, including one or more processors, configured to perform error handling when, as a result of the verification, an identifier retained in a specified output memory among the plurality of output memories does not match with an identifier retained in a specified one of the input memories that corresponds to the specified output memory.

3. An information processing method in an information processing device including a processing unit that processes a plurality of information pieces, comprising:
   by the information processing device,
   assigning identifiers to the plurality of information pieces, respectively;
   retaining the plurality of information pieces and the identifiers assigned to the plurality of information pieces in a plurality of input memories, respectively;
   retaining the plurality of information pieces processed by the processing unit and the identifiers assigned to the plurality of processed information pieces in a plurality of output memories, respectively; and
   verifying the identifiers respectively retained in the output memories, by comparing the identifiers respectively retained in the output memories with the identifiers respectively retained in the input memories, respectively.

4. The information processing method according to claim 3, further comprising, by the information processing device, performing error handling when, as a result of the verifying, an identifier retained in a specified output memory among the plurality of output memories does not match with an identifier retained in a specified one of the input memories that corresponds to the specified output memory.

5. A non-transitory computer readable medium storing one or more instructions causing a computer to execute:
   assigning identifiers to the plurality of information pieces, respectively;
   retaining the plurality of information pieces and the identifiers assigned to the plurality of information pieces in a plurality of input memories, respectively;
   retaining the plurality of information pieces processed by the processing unit and the identifiers assigned to the plurality of processed information pieces in a plurality of output memories, respectively; and
   verifying the identifiers respectively retained in the output memories, by comparing the identifiers respectively retained in the output memories with the identifiers respectively retained in the input memories, respectively.

6. The non-transitory computer readable medium according to claim 5, further comprising, by the information processing device, performing error handling when, as a result of the verifying, an identifier retained in a specified output memory among the plurality of output memories does not match with an identifier retained in a specified one of the input memories that corresponds to the specified output memory.

* * * * *